Patented July 23, 1929.

1,721,560

UNITED STATES PATENT OFFICE.

GEORG KALISCHER AND HEINZ SCHEYER, OF FRANKFORT-ON-THE-MAIN, GERMANY, ASSIGNORS TO I. G. FARBENINDUSTRIE AKTIENGESELLSCHAFT, A CORPORATION OF GERMANY.

CARBOXYLIC ACID OF THE FATTY-AROMATIC SERIES AND PROCESS OF MAKING SAME.

No Drawing. Application filed July 9, 1927, Serial No. 204,660, and in Germany August 11, 1926.

Our invention relates to new carboxylic acids of the fatty-aromatic series, which are obtained by heating an unsaturated acid compound of the type

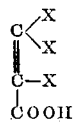

wherein the X's mean hydrogen atoms, which may be replaced by a monovalent substituent such as halogen, alkyl, aryl, aralkyl, a further carboxylic group etc., with polycyclic aromatic hydrocarbons containing more than two condensed nuclei, or their substitution products. For obtaining pure condensation products in a good yield it may be advantageous to carry out the reaction with addition of an acid condensing agent such as a haloid hydrogen acid or aluminium chloride and for homogenizing the mass of reaction in some cases it is advisable to work in presence of a diluent. We have further found that instead of using the unsaturated acids themselves one may start from their haloid hydrogen addition products being often more easily obtainable, which compounds under the conditions applied in the course of the reaction are converted into the corresponding olefinic carboxylic acids haloid hydrogen being split off. In consequence thereof e. g. acrylic acid and α- and β-chloropropionic acid yield the same condensation products when used in the process.

In the reaction of the new process the double binding of the unsaturated carboxylic acids probably joins with a double binding of the aromatic hydrocarbon applied.

As polycyclic aromatic hydrocarbons appropriated for the process anthracene, phenanthrene, chrysene and their substitution products may be named, containing in the nuclei one or more nonreactive substituents such as halogens, alkyl, hydroxy-, alkoxy-, aryloxy-, aralkyloxy groups etc., among the unsaturated acid compounds of the aforesaid type or their equivalent haloid hydrogen addition products one may use for our process e. g. acrylic acid, α- and β- chloropropionic acid, their homologues and substitution products, such as crotonic acid, chloroacrylic and chlorocrotonic acid, further the aryl-acrylic acids, their homologues and substitution products such as phenylacrylic acid, α- and β-chlorohydrophenylacrylic acid and hydroxyphenylacrylic acid. As starting materials containing a further carboxylic group in their molecule, maleic acid, chlorosuccinic acid, etc. may be used. Instead of the carboxylic acids compounds reacting like them such as the acid halogenides, esters, anhydrides and the like may be used for the process.

The new carboxylic acids of the fatty-aromatic series are when dry whitish to feebly colored crystalline powders, having a definite melting point, being soluble in organic solvents, forming metal salts and derivatives, such as esters, anhydrides, chlorides, most of them being characterized by a characteristic fluorescence of their solutions in alcohol as well as of the aqueous solutions of their sodium salts. They may be used as intermediates for the production of dyestuffs and pharmaceutical products.

In order to further illustrate our invention the following examples are given, the parts being by weight and all temperatures in centigrade degrees, but it is understood, that our invention is not limited to the particular products of reacting conditions mentioned therein.

Example 1.

At about 110°, 2 parts of anthracene are suspended in 7 parts of acrylic acid and while increasing the temperature slowly to about 170° a current of hydrochloric acid gas is introduced into the mixture for some hours. After cooling down the mass is poured into water and the remaining precipitate is filtered, dissolved in a caustic alkali solution and precipitated again by acidifying the alkaline solution. The new compound thus obtained corresponds probably to the formula:

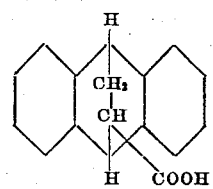

It is easily soluble in the usual organic solvents, its solution in alcohol shows a blue fluorescence, it melts at 187–188° when recrystallized from benzene. It forms a well crystallized sodium salt, difficultly soluble in water, characterized by a blue fluorescence of its aqueous solutions.

Example 2.

A solution of 2 parts of anthracene and 5 parts of β-chloro-propionic acid in about 8 parts of dichlorobenzene is heated to the boiling point for about 5 hours. After having driven off the dichlorobenzene with steam the remaining carboxylic acid is purified by dissolving it in a caustic alkali solution and precipitating it therefrom with acids. The compound, thus obtained is identical with the product described in Example 1. The same product is obtained when using α-chloropropionic acid.

Example 3.

A mixture of 3 parts of anthracene and 10 parts of maleic acid is heated to about 170° for some hours. The mass is poured into water and the precipitate thus obtained is isolated by filtration. For purifying the raw product it may be dissolved in a caustic soda solution. After filtering and cooling down this solution the sodium salt of the new compound separates as colorless crystals of a nacreous lustre. By acidifying the hot aqueous solution of the alkali salt and boiling for a short time, the new compound is obtained in the form of its anhydride of the probable formula:

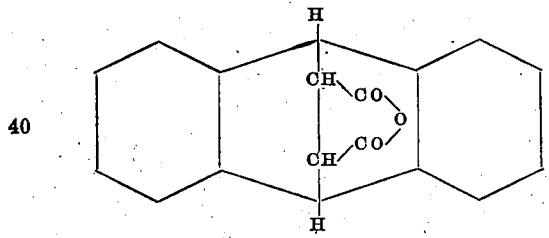

which crystallizes from glacial acetic acid as compact crystals, melting at 255°.

By replacing the maleic acid by the equivalent amount of its anhydride the reaction runs in the same way and the same condensation product is obtained.

Example 4.

A mixture of 2 parts of cinnamic acid and of 1 part of anthracene is heated while simultaneously introducing a current of hydrochloric acid gas, to about 170° for several hours until the anthracene has disappeared. After cooling down the mass is dissolved in a caustic alkali solution and after separating the unchanged anthracene the new compound is precipitated by adding a mineral acid such as hydrochloric acid. The excess of cinnamic acid, separating simultaneously, is then removed in a suitable manner, e. g. by extracting with an acetic acid of 50%. The remaining product of condensation may be purified by recrystallization from benzene. The new compound, having probably the formula:

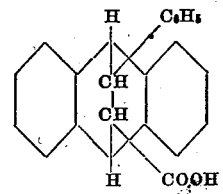

is in the dry state a pure white powder, which melts at 232° and is easily soluble in the usual organic solvents. It forms a sodium salt crystallizing in bright scales, easily soluble in hot water, and difficultly soluble in cold water.

Homologous products are obtained by replacing the cinnamic acid by its substitution products such as ortho- and para-chloro- and hydroxy-phenylacrylic acid.

Example 5.

A mixture of 10 parts of chloropropionic acid and 3 parts of meso-dichloranthracene is heated to about 180° for about 3 hours. The mass is poured into water and the product of reaction, which separates at first in a resinous state, is dissolved in a caustic alkali solution and precipitated by acidifying this solution. The new compound, having probably the formula:

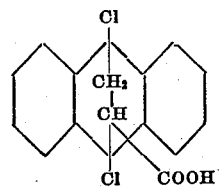

is then obtained as a pure white powder which is easily soluble in most organic solvents, its alcoholic solution being characterized by a blue fluorescence, and which melts at 237° after recrystallization from glacial acetic acid.

By using other substitution products of anthracene such as other halogenated, alkylated or hydroxy derivatives, similar products are obtained, e. g. by using 1.5-dichloroanthracene, a colorless product, melting at 218°, by using 2.7-dimethylanthracene, a nearly colorless product, melting at about 205°, by using 1-hydroxyanthracene, a greyish colored product is obtained, soluble in the usual organic solvents and in a sodium carbonate solution with a brownish color, forming azocompounds when combined with diazocompounds, e. g. an orange-yellow product with diazo-p-nitrobenzene.

When anthracene is replaced by other condensed polycyclic aromatic hydrocarbons, when condensing e. g. in an analogous manner 3 parts of phenanthrene with 10 parts of chloropropionic acid a new carboxylic acid is obtained containing the phenanthrene residue and melting at 132°, when recrystallized from benzene. In the same manner its methyl-isopropyl homologue, i. e. retene may be used for our process.

In the appended claims, by the term "a trinuclear aromatic hydrocarbon compound" we wish to include trinuclear aromatic hydocarbons as well as their substitution products.

We claim:

1. As new products the compounds of the general formula:

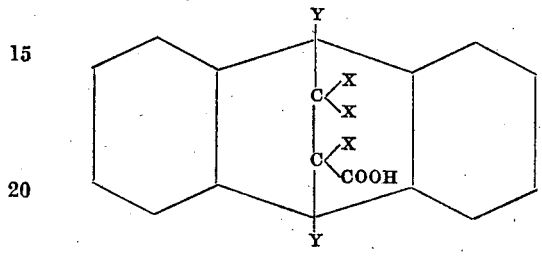

wherein X represents hydrogen or a monovalent substituent, Y hydrogen or halogen, and the anthracene nucleus may be further substituted, being in a dry state whitish to feebly colored crystalline powders.

2. As new products the compounds of the general formula:

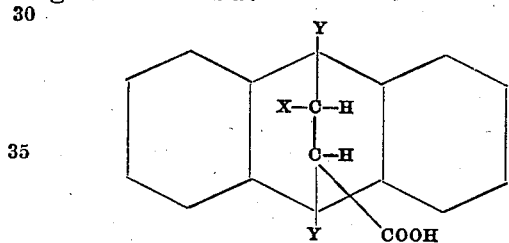

wherein X represents hydrogen or phenyl and Y hydrogen or chlorine, being in a dry state whitish to feebly colored crystalline powders.

3. As a new product the compound of the most probable formula:

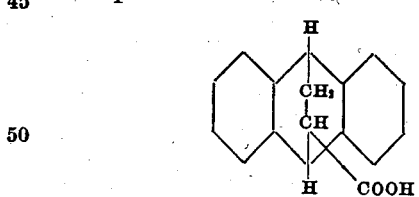

being in a dry state a colorless powder melting when recrystallized from benzene at 187–188° C., being easily soluble in the usual organic solvents and difficultly soluble in water.

4. The process which comprises causing a trinuclear aromatic hydrocarbon compound to interact with a compound of the general formula:

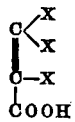

wherein X represents hydrogen or a monovalent substituent.

5. The process which comprises causing a trinuclear aromatic hydrocarbon compound to interact with a compound of the general formula:

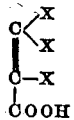

wherein X represents hydrogen or a monovalent substituent, in the presence of an acid condensing agent.

6. The process which comprises causing a trinuclear aromatic hydocarbon compound to interact with a compound of the general formula:

wherein X represents hydrogen or a monovalent substituent, in the presence of a haloid hyrogen acid.

7. The process which comprises causing a trinuclear aromatic hydrocarbon compound to interact with a compound of the general formula:

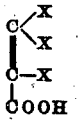

wherein X represents hydrogen or a monovalent substituent, in the presence of a diluent and an acid condensing agent.

8. The process which comprises heating anthracene with acrylic acid at a temperature of about 110–170° C. in the presence of hydrochloric acid.

In testimony whereof, we affix our signatures.

GEORG KALISCHER.
HEINZ SCHEYER.